US012472095B2

(12) United States Patent
Gee

(10) Patent No.: US 12,472,095 B2
(45) Date of Patent: Nov. 18, 2025

(54) APPARATUS, SYSTEM AND METHOD OF PROVIDING A SURGICAL HANDPIECE HAVING AN EMULSIFYING TIP CAPABLE OF TRANSVERSE AND LONGITUDINAL MOTION

(71) Applicant: Johnson & Johnson Surgical Vision, Inc., Irvine, CA (US)

(72) Inventor: Jacob Gee, Blanchester, OH (US)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 949 days.

(21) Appl. No.: 17/595,311

(22) PCT Filed: May 15, 2020

(86) PCT No.: PCT/IB2020/054649
§ 371 (c)(1),
(2) Date: Nov. 12, 2021

(87) PCT Pub. No.: WO2020/234732
PCT Pub. Date: Nov. 26, 2020

(65) Prior Publication Data
US 2022/0192881 A1    Jun. 23, 2022

Related U.S. Application Data

(60) Provisional application No. 62/849,786, filed on May 17, 2019.

(51) Int. Cl.
*A61F 9/007*  (2006.01)
*A61B 17/00*  (2006.01)
*A61B 17/32*  (2006.01)

(52) U.S. Cl.
CPC .............. *A61F 9/00745* (2013.01); *A61B 2017/00199* (2013.01); *A61B 2017/00402* (2013.01); *A61B 2017/320098* (2017.08)

(58) Field of Classification Search
CPC ....... A61F 9/00745; A61B 2017/00199; A61B 2017/00402; A61B 2017/320098; G01T 1/00; H01H 35/00
(Continued)

(56) References Cited

U.S. PATENT DOCUMENTS 2,838,695 A   6/1958   Thurston
2,838,696 A   6/1958   Thurston
(Continued)

FOREIGN PATENT DOCUMENTS

EP    0910292 B1   7/2005
JP    H0329645 A   2/1991
(Continued)

OTHER PUBLICATIONS

U.S. Appl. No. 17/231,450, titled, "Compensating for Imperfect Behavior of Multi-Piezoelectric Crystal," filed Apr. 15, 2021.
(Continued)

*Primary Examiner* — Ashley L Fishback
*Assistant Examiner* — Chima U Igboko

(57) ABSTRACT

An apparatus, system and method for providing a surgical handpiece. The apparatus, system and method may include: an ultrasonic horn having an emulsifying needle at a distal end thereof; a plurality of piezoelements about a proximal end of the ultrasonic horn; a plurality of electrode segments comprising first sets of the electrode segments atop each of the piezoelements and second sets of the electrode segments below each of the piezoelements, and comprising at least pairs of the electrode segments in which each pair comprises an electrode segment atop a one of the piezoelements and a paired electrode segment below that one of the piezoelements; and a power source applied via a controlled double-pole, double-throw (DPDT) switch.

20 Claims, 6 Drawing Sheets

(58) Field of Classification Search
USPC .................................................. 307/112, 125
See application file for complete search history.

(56) References Cited

U.S. PATENT DOCUMENTS

| | | | |
|---|---|---|---|
| 4,872,346 | A | 10/1989 | Kelly-Fry et al. |
| 4,961,424 | A | 10/1990 | Kubota et al. |
| 5,162,044 | A | 11/1992 | Gahn et al. |
| 5,814,922 | A | 9/1998 | Uchino et al. |
| 6,346,764 | B1 | 2/2002 | Boyd |
| 6,352,519 | B1 | 3/2002 | Anis et al. |
| 7,794,414 | B2 | 9/2010 | Rabiner et al. |
| 8,303,613 | B2 | 11/2012 | Crandall et al. |
| 9,216,035 | B2 | 12/2015 | Urich et al. |
| 9,517,346 | B2 | 12/2016 | Lee et al. |
| 2004/0242709 | A1* | 12/2004 | Oguro ............... B25J 9/12 204/252 |
| 2004/0267298 | A1* | 12/2004 | Cimino ........ A61B 17/320068 606/167 |
| 2005/0187513 | A1 | 8/2005 | Rabiner et al. |
| 2007/0249941 | A1 | 10/2007 | Salehi et al. |
| 2008/0258563 | A1* | 10/2008 | Hodges ............. H01R 13/7038 307/112 |
| 2009/0005712 | A1* | 1/2009 | Raney ............... A61F 9/00745 601/2 |
| 2009/0099536 | A1 | 4/2009 | Akahoshi |
| 2009/0149801 | A1* | 6/2009 | Crandall ............ A61F 9/00745 604/22 |
| 2012/0143233 | A1 | 6/2012 | Sinelnikov |
| 2013/0006266 | A1 | 1/2013 | Crandall et al. |
| 2013/0253559 | A1 | 9/2013 | Slipszenko et al. |
| 2014/0055932 | A1 | 2/2014 | Nakamura |
| 2014/0217832 | A1* | 8/2014 | Phadke ................. H02H 9/005 307/112 |
| 2015/0173950 | A1 | 6/2015 | Nallakrishnan |
| 2015/0257778 | A1 | 9/2015 | Harrington et al. |
| 2016/0038340 | A1 | 2/2016 | Raney |
| 2018/0078268 | A1 | 3/2018 | Messerly et al. |
| 2019/0008680 | A1 | 1/2019 | Jochinsen et al. |
| 2020/0268398 | A1 | 8/2020 | Gill et al. |
| 2020/0384502 | A1 | 12/2020 | Downey et al. |
| 2021/0330493 | A1 | 10/2021 | Steen et al. |
| 2021/0353461 | A1 | 11/2021 | Govari et al. |
| 2021/0361481 | A1 | 11/2021 | Gliner et al. |
| 2022/0105688 | A1 | 4/2022 | Dippel et al. |
| 2022/0192880 | A1 | 6/2022 | Gee |
| 2022/0331159 | A1 | 10/2022 | Gliner |
| 2023/0240889 | A1 | 8/2023 | Fuchs et al. |
| 2023/0338189 | A1 | 10/2023 | Fuchs |

FOREIGN PATENT DOCUMENTS

| | | |
|---|---|---|
| JP | H11206162 A | 7/1999 |
| WO | 2010018760 A1 | 2/2010 |
| WO | 2010057059 A1 | 5/2010 |
| WO | 2015126914 A1 | 8/2015 |
| WO | 2022219464 A1 | 10/2022 |
| WO | 2023017333 A1 | 2/2023 |

OTHER PUBLICATIONS

U.S. Appl. No. 17/590,184, titled, "Equalizing Multi-Channel Driving Signals of Segmented Piezoelectric Crystals," filed Feb. 1, 2022.
Chen Y., et al., "Tip Trajectories of a Smart Micro-cantilever Beam: Analysis and Design," Smart Materials and Structures, 2009, vol. 18 (11), pp. 115012 (10 pages), XP020168951.
Co-pending U.S. Appl. No. 17/231,450, filed Apr. 15, 2021, 20 pages.

* cited by examiner

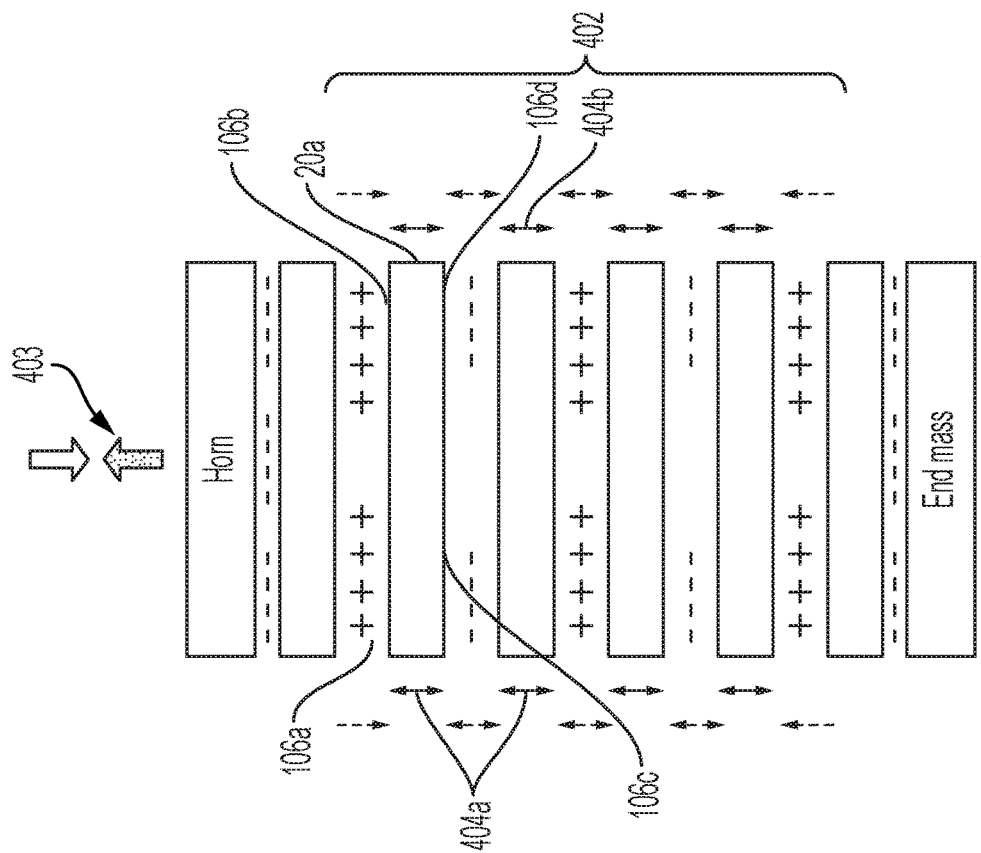
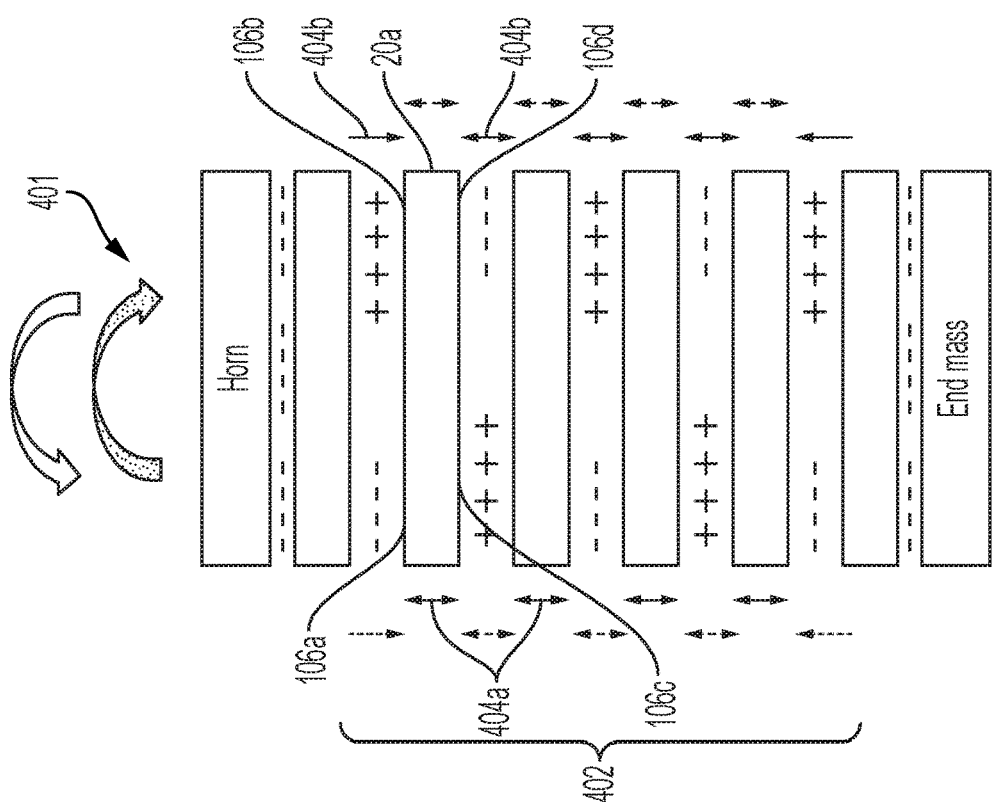

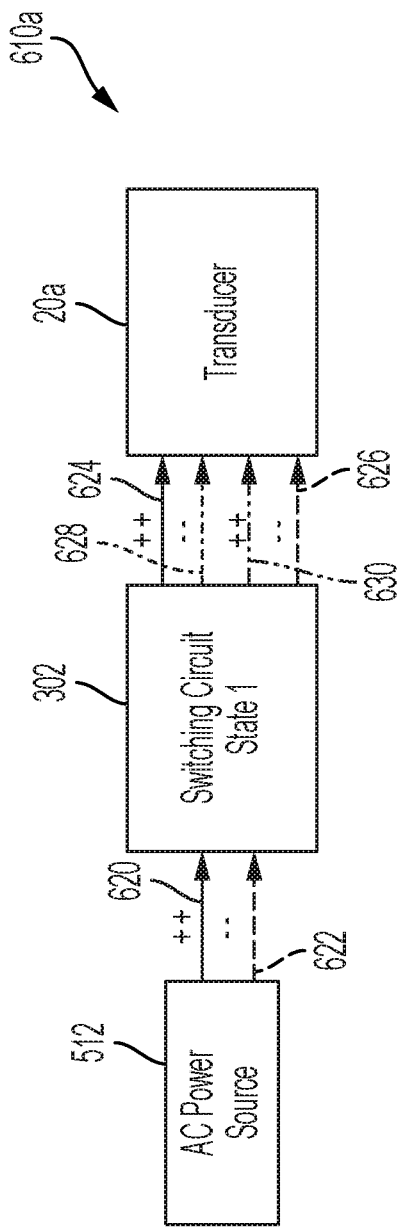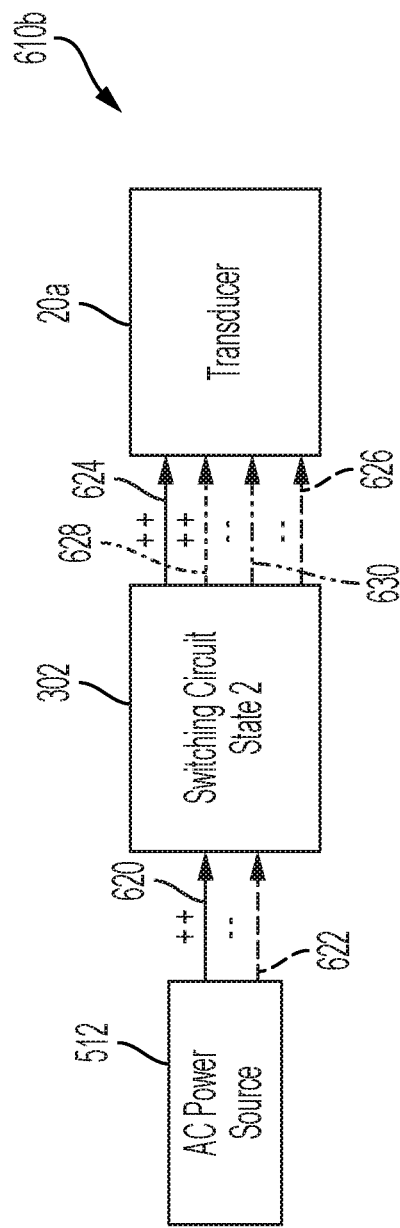
FIGURE 6A
FIGURE 6B

APPARATUS, SYSTEM AND METHOD OF PROVIDING A SURGICAL HANDPIECE HAVING AN EMULSIFYING TIP CAPABLE OF TRANSVERSE AND LONGITUDINAL MOTION

CROSS REFERENCE TO RELATED APPLICATIONS

This application is a U.S. national stage of and claims the benefit under 35 U.S.C. § 371 of International Patent Application No. PCT/IB2020/054649, filed May 15, 2020, which claims priority to U.S. Provisional Patent Application No. 62/849,786, filed on May 17, 2019, the entire contents of which are hereby incorporated by reference in their entirety.

BACKGROUND

Field of the Disclosure

The present invention relates to phacoemulsification and similar procedures of the eye, and, more particularly, to inducing both transverse and longitudinal motion in a surgical emulsifying tip.

Description of the Background

A cataract is an opacity that develops in the lens of an eye. Cataracts are the most significant cause of blindness worldwide.

Phacoemulsification is a medically recognized technique utilized for crystalline lens removal, which is a highly prevalent method of treating cataracts. Phacoemulsification includes making a corneal and/or scleral incision, and the insertion of a portion of a phacoemulsification handpiece, which is typically comprised of a vibrating needle that is ultrasonically driven in order to emulsify, i.e., to liquefy, the natural crystalline lens and/or an unhealthy aspect, such as a cataract, associated therewith. Once removed, the emulsified lens may be replaced with a prosthetic intraocular lens implant.

The phacoemulsification handpiece is generally coupled to an irrigation source and an aspiration pump. As referenced, the handpiece includes a distal tip for insertion within the anterior chamber of the patient's eye and which uses ultrasonic energy to emulsify the crystalline lens. The handpiece further includes at least one irrigation port proximal to the distal tip, which is coupled to the irrigation source, such as a balanced salt solution, via an irrigation line; and an aspiration port at the distal tip, which is coupled to one or more aspiration pump via an aspiration line. Fluid from the irrigation source, which may be an elevated bottle of saline solution and/or a pressurized irrigation source, is directed into the eye via the irrigation line and the irrigation port, and the irrigation fluid and emulsified crystalline lens material are aspirated from the eye by the one or more aspiration pumps via the aspiration port and the aspiration line.

In a phacoemulsification handpiece, an ultrasonic horn coupled with a hollow needle is generally used. The horn resides in a housing which typically includes an irrigation port for introducing the aforementioned irrigation fluid through the handpiece and into the affected eye.

A series of ultrasonic elements, e.g. piezoelectric crystals, referred to herein as a "stack", is disposed about the horn. When the stack is ultrasonically oscillated, the ultrasonic elements expand and contract, thereby causing rapid longitudinal vibration in the horn, and thus in the needle attached to the horn. The longitudinal vibration emulsifies the cataractous lens.

However, during phacoemulsification in particular, it is possible for the aspirating phacoemulsification handpiece to become occluded by emulsified particulate that blocks the tip of the needle of the aspirating handpiece. For volumetric flow pumps, this blockage can result in increased vacuum. For a vacuum-based pump, this blockage can result in a volumetric fluid flow drop off near the aspiration port. In each such case, once the occlusion is cleared, the resulting rush of fluid from the anterior chamber into the aspiration line can outpace the volumetric flow of new fluid into the eye from the irrigation source, which may lead to severe eye trauma.

Transverse motion would provide a side-to-side or "sanding" motion that would remove cataract material without the negative effect of kicking the material away from the tip, which happens with longitudinal motion. However, with transverse motion arises the potential for cataract material to get clogged in the tip or along the lumen of the transducer and/or handpiece. In such a case, the longitudinal motion through the tip helps clear material.

It is thus understood that longitudinal and transverse motion induced in the needle may optimally help in clearing obstructions to the aspiration aspects of the handpiece. Thus, a need exists to efficiently induce both longitudinal and tranverse motion in a phacoemulsification needle.

SUMMARY

The disclosed apparatus, system and method is and may include at least a surgical handpiece. The surgical handpiece includes an ultrasonic horn having an emulsifying needle at a distal end thereof; a plurality of piezoelements about a proximal end of the ultrasonic horn; a plurality of electrode segments comprising first sets of the electrode segments atop each of the piezoelements and second sets of the electrode segments below each of the piezoelements, and comprising at least pairs of the electrode segments in which each pair comprises an electrode segment atop a one of the piezoelements and a paired electrode segment below that one of the piezoelements; and a power source applied via a controlled double-pole, double-throw (DPDT) switch.

A first oscillating uniform excitation of the first sets with a first uniform opposing excitation of the second sets by the power source may effectuate a longitudinal ultrasonic vibration of the ultrasonic horn. A second oscillating uniform excitation of first ones of the pairs with a second uniform opposing excitation of other ones of the pairs may effectuate a transversal ultrasonic vibration of the ultrasonic horn.

Thus, the disclosed embodiments provide an apparatus, system, and method for efficiently inducing both longitudinal and transverse motion in a phacoemulsification needle

BRIEF DESCRIPTION OF THE FIGURES

Referring now to the figures incorporated herein, shown are non-limiting embodiments of the present disclosure, wherein like numerals may, but do not necessarily, represent like elements, and wherein:

FIGS. 4A and 4B are illustrations of aspects of the embodiments;

FIGS. 6A and 6B are illustrations of aspects of the embodiments.

DETAILED DESCRIPTION

Figure 1:
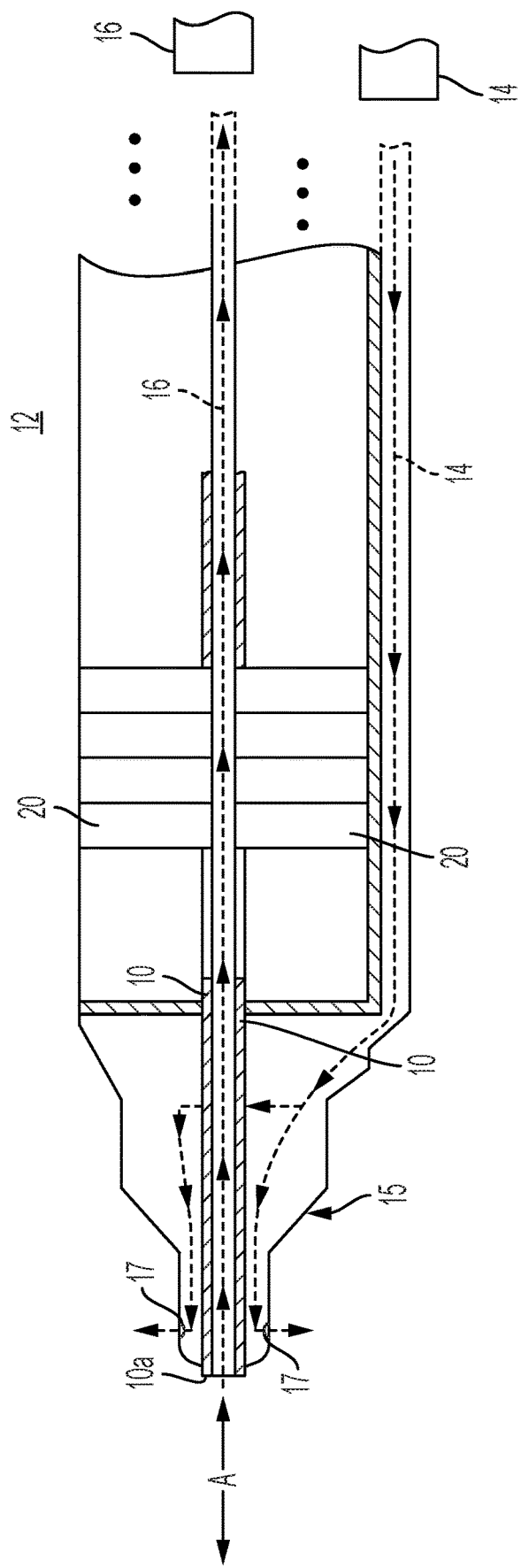
FIG. 1 is an illustration of aspects of the embodiments.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

The terminology used herein is for the purpose of describing particular exemplary embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Certain types of ocular dysfunction, such as cataracts, are commonly treated with surgical procedures, such as to remove the natural lens from the eye and replace it with a clear artificial lens. More particularly and by way of example, phacoemulsification refers to a surgery, often employed when a patient suffers from cataracts, in which the eye's natural lens is emulsified by applying ultrasonic energy to the lens using a handpiece. As the lens is emulsified, it is aspirated from the eye by applying a vacuum to the emulsified lens material. During the procedure, irrigation is fluid is administered into the eye as the emulsified material is aspirated, thereby maintaining pressure in the interior of the eye. The emulsified lens is then typically replaced with a clear artificial intraocular lens (IOL).

To perform the afore-discussed and similar procedures, a surgeon often utilizes a computer-controlled system of specialized equipment called a phacoemulsification system console to control and execute the ultrasonic emulsification and aspiration of the natural lens of the eye prior to inserting the IOL. During the procedure, information such as the amount of vacuum applied to aspirate, the flow rate, a microscopic view of the operating field, and the like, may be displayed on and controllable from a user interface of the phacoemulsification system console, or on a separate screen, computer, or other viewing device, and may be monitored and verbally reported by support staff during the procedure. At least some of this data is commonly used to inform and improve ongoing and subsequent procedures.

In phacoemulsification, the ultrasonic vibration of the handpiece tip is generally paired with irrigation and the aspiration in order to safely and effectively perform the surgery, as discussed throughout. In a typical cataract surgery, by way of example, the vacuum pulls the lens material up to the vibrating tip and holds it in place to be broken down into pieces small enough to be aspirated via the handpiece out of the eye. However, a common issue referred to as post occlusion surge may lead to severe trauma to structures of the eye during performance of the surgery. Post occlusion surge occurs when the tip of the needle is partially or completely blocked, such as by the emulsified material, and the vacuum consequently builds between the handpiece and the one or more pumps.

The embodiments provide an ultrasonic horn, such as for use in phacoemulsification surgeries, that provides longitudinal motion at the needle tip, and provides a transversal/flexural motion at the needle tip to emulsify the lens of the eye. The transversal motion provides a side-to-side or backand-forth "sanding" motion at the tip to break up the lens and the longitudinal motion that causes the occluding particulate to move away from the tip, thereby leading to the aspiration sucking the entire particle back such that the occlusion occurs anew.

The ultrasonic transducers that drive both motion types in the disclosure may each respectively include wired, semi-circular electrodes at the top and bottom of a piezo-element. Alternatively, the electrodes may be or include flexible circuits. The individual transducers are provided in a stack of transducers about the horn so as to ultrasonically ring the horn pursuant to control signals.

More specifically, control signals may drive at least one digital or analog double-pole, double-throw (DPDT) switching circuits. When the DPDT switch is in a first position, the opposing semi-circular electrodes receive alternating energy, which causes the respective piezoelement to grow on one side and shrink on the other side, thereby effectuating a side to side excitation generating a flexural/transversal mode. However, when the DPDT switch is in a second position, the transducers cause the horn's piezodisks to grow and shrink together, thus effectuating a longitudinal mode.

FIG. 1 illustrates handpiece 12 having ultrasonic horn 10. The horn 10 is fixedly associated with phacoemulsification handpiece 12. The handpiece 12 would additionally provide irrigation fluid 14 via sleeve 15 and irrigation port 17; and aspiration 16 through needle 10a, such that irrigation and aspiration may flow to and from the end of handpiece 12 at which the emulsification occurs.

An emulsifying needle 10a is associated with horn 10. Disposed about the horn 10 is a plurality of transducers 20. Typically, an oscillating voltage is applied to opposing faces of each of the transducers in order to cause oscillating expansion and contraction of the respective transducers 20. This expansion and contraction causes movement of the horn 10 (in one or more directions, e.g. longitudinal, transversal, torsional, or the like), and thus movement of the emulsifying needle 10a, for example, for longitudinal movement, the needle 10a moves axially along axis A of FIG. 1.

Figure 2:
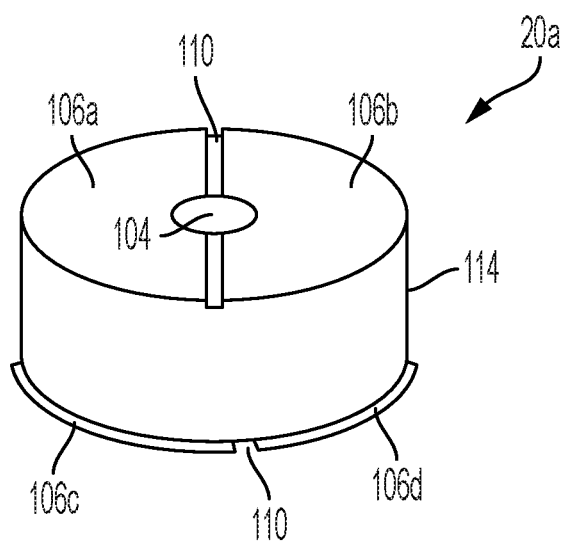
FIG. 2 is an illustration of aspects of the embodiments.

FIG. 2 illustrates a single transducer element 20a. The transducer element 20a may provide a hole 104 therethrough so as to allow the horn 10, terminating in the needle 10a, to pass through the hole 104. The transducer 20a may have an at least substantially circular shape.

In the illustrated embodiment, both the top and bottom of the transducer 20a include two semi-circular electrodes 106a, b, c, d, atop and below halves of a piezoelement, such as a ceramic, 114. The top electrodes 106a, b, and the bottom electrodes 106c, d, may respectively have therebetween a gap 110. The gap 110 may or may not comprise electrical insulation. Moreover, the gap 110 may additionally extend through the piezoelement 114, such as to add insulating properties in the operations between halves of the transducers 20a as discussed throughout.

The electrodes 106a, b, c, and d may preferably be highly conductive, such as having a metallic composition. By way of non-limiting example, the composition of the electrodes 106a, b, c, and d may be or include silver. Accordingly, the generation of an electrical potential between the respective left 106a, c and right 106b, d pairs of the top and bottom electrodes on opposing faces of the piezoelement 114 causes a physical expansion or contraction of the piezoelement 114 portion between the top/bottom pairs of electrodes 106.

Figure 3B:
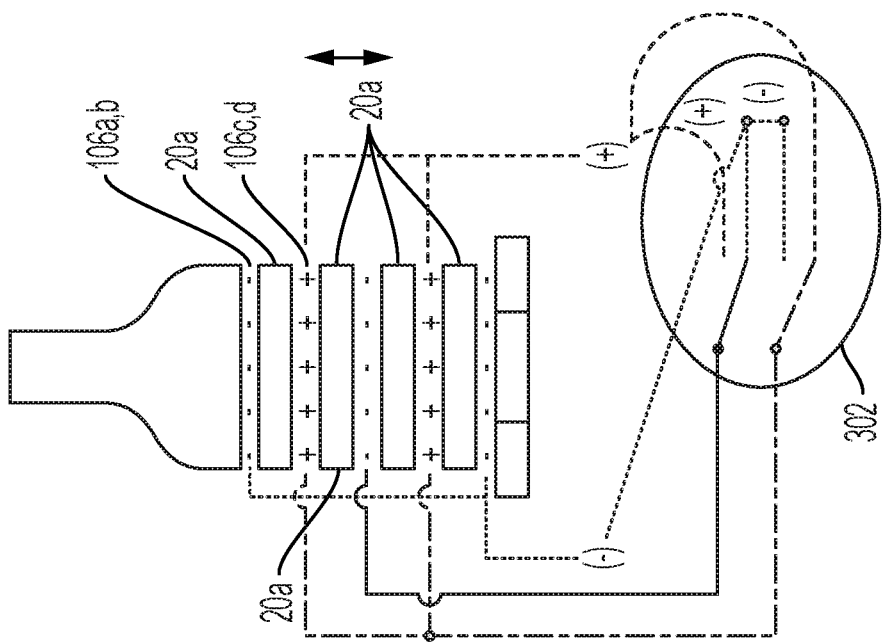
FIGS. 3A and 3B are illustrations of aspects of the embodiments.
Figure 3A:
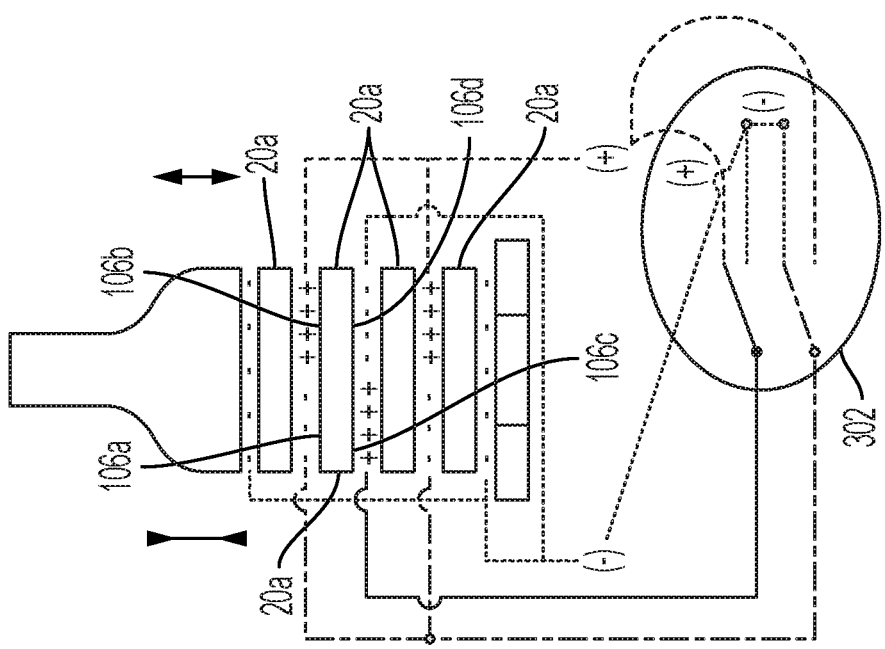

As such, and as illustrated with particularity in FIGS. 3A and 3B, application of a voltage potential in the known manner, such as is illustrated in FIG. 3B, in which alternating opposing potentials are applied to the respective entire "top" (i.e., both top electrodes 106a, b), and the respective entire "bottom" (i.e., both bottom electrodes 106c, d), of each transducer 20a. These applications of voltage, when the DPDT switch 302 is in position 1 as shown in FIG. 3B, effectuate a longitudinal expansion and contraction of each transducer 20a, thereby allowing the stack of transducers to drive longitudinal actuation of the correspondent emulsifying needle (not shown in FIG. 3), as will be appreciated by the skilled artisan.

In contrast, when the DPDT switch 302 is in position 2, as shown in FIG. 3A, opposing potentials are not only respectively applied on the top and bottom of each transducer 20a, opposing potentials are also applied to each half of the top, and each half of the bottom, of each transducer 20a. This corresponds to the application of distinct potentials to each set (i.e., top or bottom) of electrodes 106a, b and 106c, d, and to each pair (i.e., top left and bottom left, and top right and bottom right) of electrodes 106a, c and 106b, d. Thereby, each transducer 20a will expand on one side thereof, and contract on the other side thereof. As will be appreciated by the skilled artisan, this effectuates a flexural motion in the transducers 20a, which causes transversal vibration of the correspondent emulsifying needle (not shown in FIG. 3).

FIGS. 4A and 4B illustrate, with particularity, an exemplary transducer stack 402 in both of the aforementioned modes of operations, and correspondent to position 1 of DPDT 302 (FIG. 3A) and position 2 of same (FIG. 3B). By way of example, FIG. 4A illustrates that the application of opposing potentials to both the sets 106a, b and 106c, d and pairs 106a, c and 106b, d of electrodes causes, on each respective transducer 20a of the stack 402, opposing behaviors 404a, 404b on each side of each respective transducer 20a. Thereby, the combination of behaviors 404a, 404b on alternating sides of alternating ones of the transducers 20a cause the afore-discussed flexural motion 401 in stack 402.

As was illustrated in FIG. 3B, FIG. 4B shows the operation of stack 402 in longitudinal mode. More particularly, although each pair of electrodes 106a, c and 106b, d still receives application of opposing potentials, each set of electrodes 106a, b and 106c, d now has applied thereto the same potential. Accordingly, each side 404a, 404b of each respective transducer 20a in the stack 402 now behaves uniformly with respect to each other side in each electrode set. Thereby, the uniform expansion and contraction of both sides 404a, 404b of each transducer 20a causes the stack 402 to drive a longitudinal motion 403.

Figure 5:
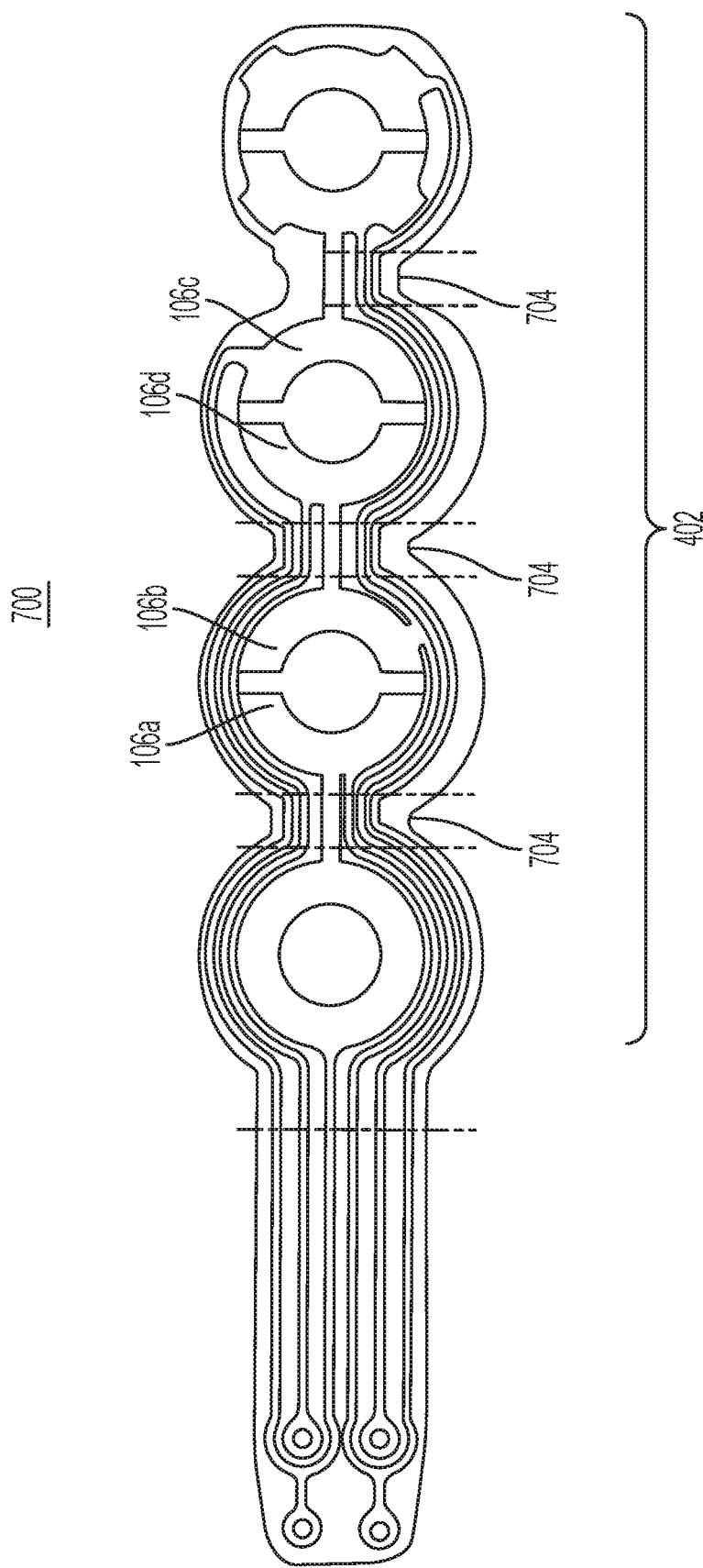
FIG. 5 is an illustration of aspects of the embodiments.

FIG. 5 illustrates the use of a control system 500, such as may reside in a surgical console 502 and be responsive to input to a user interface 504, to control handpiece 12. The control system 500 may be locally or remotely, and wired or wirelessly communicatively associated with user interface 504 and with one or more voltage supplies 508 that are electrically communicative with the DPDT switch 302, and thus with the stack 402 of handpiece 12, as discussed throughout.

The control system 500 may comprise, in part, hardware, software or firmware, or combinations thereof. More specifically, the control system 500 may at least partially comprise non-transitory computing code stored in a computing memory and executed by at least one computing processor.

As referenced above, the DPDT switch 302 may be analog or digital in performance of its disclosed functionality. That is, the DPDT may operate as, in essence, a state machine 510 of the control system 500, whereby the choice of which of the multiple states available to the DPDT switch 302 are controlled by the state machine 510. Of note, and as discussed further herein below, the state machine 510 may also include states for the power (such as amplitude and/or frequency) 512 applied to the DPDT switch 302, such as may be based on the choice of state for the DPDT switch 302.

By way of non-limiting example, FIGS. 6A and 6B illustrate multiple states 610a, b for the power source 512 (which, in the illustration, is an AC power source, by way of non-limiting example), and/or the DPDT switch 302, leading to variations in the state of the individual transducers 20a and, thereby, the stack 402. Simply put, the resultant states of stack 402 may result in one of the operational states for the handpiece 12 referenced above—that is, for example, either longitudinal and/or transversal vibration of the emulsifying needle associated with handpiece 12.

More specifically, the DPDT switch 302 may receive at least two power leads from power source 512, namely a "positive" lead 620 and a "return" lead 622. The DPDT switch 302 may also provide at least four outputs to each transducer—namely a "positive" output 624, a "return" output 626, an output A 628, and an output B 630.

The state machine 510 may provide at least two states 610 to the DPDT switch 302—namely, "positive" lead 620 to "positive" output 624 and output B 630, and return lead 622 to return output 626 and output A 628; or positive lead 620 to positive output 624 and output A 628, and return lead 622 to return output 626 and output B 630. However, as referenced above, additional states may be provided. By way of example, a third state may provide a power source at a first frequency, such as 30 kHz, by way of non-limiting example; and a fourth state may provide a power source of a second frequency, such as 38.5 kHz. These frequencies may, for example, correspond to the resonance frequencies of the transducer 20a.

Control system 500 may control other aspects, in addition to states 610, related to the disclosed embodiments. By way of example, the phases of power provided to the DPDT switch 302 and/or the transducers 20a, and the timing of variations thereof, may be controlled by control system 500. Likewise, control system 500 may control, and/or monitor compliance within a predetermined threshold of, various characteristics of the power source 512, which may necessitate actuation of various control circuits, such as feedback control loops (and correspondent sensors), such as may be digital or analog, under the control of control system 500. Such characteristics may include, by way of example, variations in power source output frequency and/or amplitude. By way of example, control system 500 may effectuate a phase shift between electrode sets 106a, b and 106c, d, thereby causing differing expansions of the right and left side of the piezoelement 114. The aforementioned adjustments available via control system may enable, for example, a real time weighting of longitudinal versus transverse motion during surgery, such as to accommodate surgical needs or preferences.

Simply put, the disclosed electronic DPDT switch may be a segmented electrode switch, such as on a printed circuit board (PCB), that electronically mimics a mechanical DPDT switch. Typical mechanical and electro-mechanical DPDT switches are relatively slow, and even the typical electromechanical DPDT switches or electrical relay switches are not designed for high current applications. Contrary to the known art, the disclosed DPDT switch, composed of a series of four MOSFETs, is capable of handling high current as they direct the signal from one output wire to the other output wire, in part by using, for example, two sets of four MOSFETs to switch two outputs.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A surgical instrument comprising:
    an ultrasonic horn having an emulsifying needle at a distal end thereof;
    a plurality of piezoelements about a proximal end of the ultrasonic horn;
    a plurality of electrode segments comprising first sets of the electrode segments atop each of the piezoelements and second sets of the electrode segments below each of the piezoelements, and comprising at least pairs of the electrode segments in which each pair comprises an electrode segment atop a one of the piezoelements and a paired electrode segment below that one of the piezoelements; and
    a power source applied via a controlled double-pole, double-throw (DPDT) switch, wherein a first oscillating uniform excitation of the first sets with a first uniform opposing excitation of the second sets by the power source effectuates a longitudinal ultrasonic vibration of the ultrasonic horn, and wherein a second oscillating uniform excitation of first ones of the pairs with a second uniform opposing excitation of other ones of the pairs effectuates a transversal ultrasonic vibration of the ultrasonic horn.

2. The surgical instrument of claim 1, wherein each of the piezoelements provides a hole therethrough to accommodate the ultrasonic horn.

3. The surgical instrument of claim 1, wherein each of the piezoelements has an at least substantially circular shape.

4. The surgical instrument of claim 1, wherein each of the electrode segments is a semi-circle.

5. The surgical instrument of claim 1, wherein each of the piezoelements comprises a ceramic.

6. The surgical instrument of claim 1, further comprising an insulated gap between ones of the electrode segments.

7. The surgical instrument of claim 1, wherein each of the electrode segments has a metallic composition.

8. The surgical instrument of claim 7, wherein the metallic composition is beryllium copper.

9. The surgical instrument of claim 1, wherein the excitation causes one of a physical expansion or contraction of at least a portion of a one of the piezoelements physically contacted to the excited electrode segments.

10. The surgical instrument of claim 1, wherein the power source comprises two outputs.

11. The surgical instrument of claim 10, wherein the DPDT switch comprises four outputs.

12. The surgical instrument of claim 1, wherein the power source comprises an alternating current voltage source.

13. The surgical instrument of claim 1, wherein the DPDT switch is analog.

14. The surgical instrument of claim 1, wherein the DPDT switch is digital.

15. The surgical instrument of claim 1, further comprising a control system capable of controlling at least the DPDT switch.

16. The surgical instrument of claim 15, wherein the control system is further capable of controlling characteristics of the power source.

17. The surgical instrument of claim 16, wherein the controlled characteristic comprises a phase.

18. The surgical instrument of claim 16, wherein the controlled characteristic comprises a frequency.

19. The surgical instrument of claim 15, wherein the control system is local to the surgical instrument.

20. The surgical instrument of claim 19, wherein the local control system comprises a surgical console providing a graphical user interface.

* * * * *